(12) United States Patent
Bloomer

(10) Patent No.: US 6,262,810 B1
(45) Date of Patent: *Jul. 17, 2001

(54) DIGITAL IMAGING COLOR CALIBRATION

(75) Inventor: Richard S. Bloomer, New Hyde Park, NY (US)

(73) Assignee: Ricoh Corporation, West Caldwell, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/927,346

(22) Filed: Sep. 11, 1997

(51) Int. Cl.[7] .............................. G06F 15/00; H04N 1/46; G03F 3/08
(52) U.S. Cl. ........................... 358/1.9; 358/504; 358/519
(58) Field of Search .................................... 358/519, 520, 358/518, 522, 521, 523, 524, 525, 527, 504, 1.9, 1.8, 1.1, 1.16, 1.17; 382/167, 162, 274

(56) References Cited

U.S. PATENT DOCUMENTS

| | | | |
|---|---|---|---|
| 4,481,532 | 11/1984 | Clark et al. | 358/80 |
| 4,482,917 | 11/1984 | Gaulke et al. | 358/80 |
| 4,483,916 | * 11/1984 | Thiers | 430/236 |
| 4,584,601 | * 4/1986 | Suzuki et al. | 358/523 |
| 4,667,228 | * 5/1987 | Kawamura et al. | 358/80 |
| 4,931,864 | * 6/1990 | Kawamura et al. | 358/80 |
| 5,053,866 | 10/1991 | Johnson | 358/75 |
| 5,155,588 | * 10/1992 | Levien | 358/518 |
| 5,174,758 | * 12/1992 | Abramson | 434/98 |
| 5,204,736 | 4/1993 | Abe | 358/75 |
| 5,243,414 | 9/1993 | Dalrymple et al. | 358/500 |
| 5,271,096 | 12/1993 | Cook | 395/131 |
| 5,305,119 | 4/1994 | Rolleston et al. | 358/522 |
| 5,363,318 | * 11/1994 | McCauley | 364/571.01 |
| 5,377,013 | 12/1994 | Oka et al. | 358/332 |
| 5,416,613 | 5/1995 | Rolleston et al. | 358/518 |
| 5,444,544 | 8/1995 | Oka et al. | 358/332 |
| 5,459,678 | * 10/1995 | Feasy | 364/571.07 |
| 5,471,324 | 11/1995 | Rolleston | 358/518 |
| 5,481,380 | 1/1996 | Bestmann | 358/504 |
| 5,483,360 | 1/1996 | Rolleston et al. | 358/518 |
| 5,491,568 | 2/1996 | Wan | 358/518 |
| 5,493,518 | 2/1996 | Keating | 364/578 |
| 5,528,377 | 6/1996 | Hutcheson | 358/298 |
| 5,528,386 | 6/1996 | Rolleston et al. | 358/522 |
| 5,537,516 | 7/1996 | Sherman et al. | 395/109 |
| 5,542,052 | 7/1996 | Deutsch et al. | 395/131 |
| 5,553,199 | 9/1996 | Spaulding et al. | 395/109 |
| 5,712,666 | * 1/1998 | Matsubara et al. | 347/19 |
| 5,712,930 | * 1/1998 | Watanabe | 382/270 |
| 5,734,800 | * 3/1998 | Herbert et al. | 395/109 |
| 5,761,573 | * 6/1998 | Hameda et al. | 399/66 |
| 5,838,465 | * 11/1998 | Satou et al. | 358/520 |
| 5,959,650 | * 9/1999 | Fukui et al. | 347/132 |

FOREIGN PATENT DOCUMENTS

| | | |
|---|---|---|
| 556133A2 | 8/1993 | (EP) . |
| 60-114862 | 6/1985 | (JP) . |
| 407203209A | * 8/1995 | (JP) . |
| 409197551A | * 7/1997 | (JP) . |
| WO92/15967 | 9/1992 | (WO) . |

* cited by examiner

Primary Examiner—Madeleine Nguyen
(74) Attorney, Agent, or Firm—Cooper & Dunham LLP

(57) ABSTRACT

The present invention relates to a method of determining optimum color density and gamma curves and includes a step of providing a first set of input color values representing a set of Cyan, Magenta and Yellow values corresponding to a desired output color. An array of color output simulations is output using the first set of input color values, the array consisting of a plurality of individual color samples having varying amounts of Cyan, Magenta and Yellow which differ by predetermined percentages. The sample which corresponds most closely with the desired output color is selected and the Cyan, Magenta and Yellow values corresponding to the sample are determined. The gamma correction curves which are used to adjust the input color values are adjusted by using the determined Cyan, Magenta and Yellow values.

24 Claims, 5 Drawing Sheets

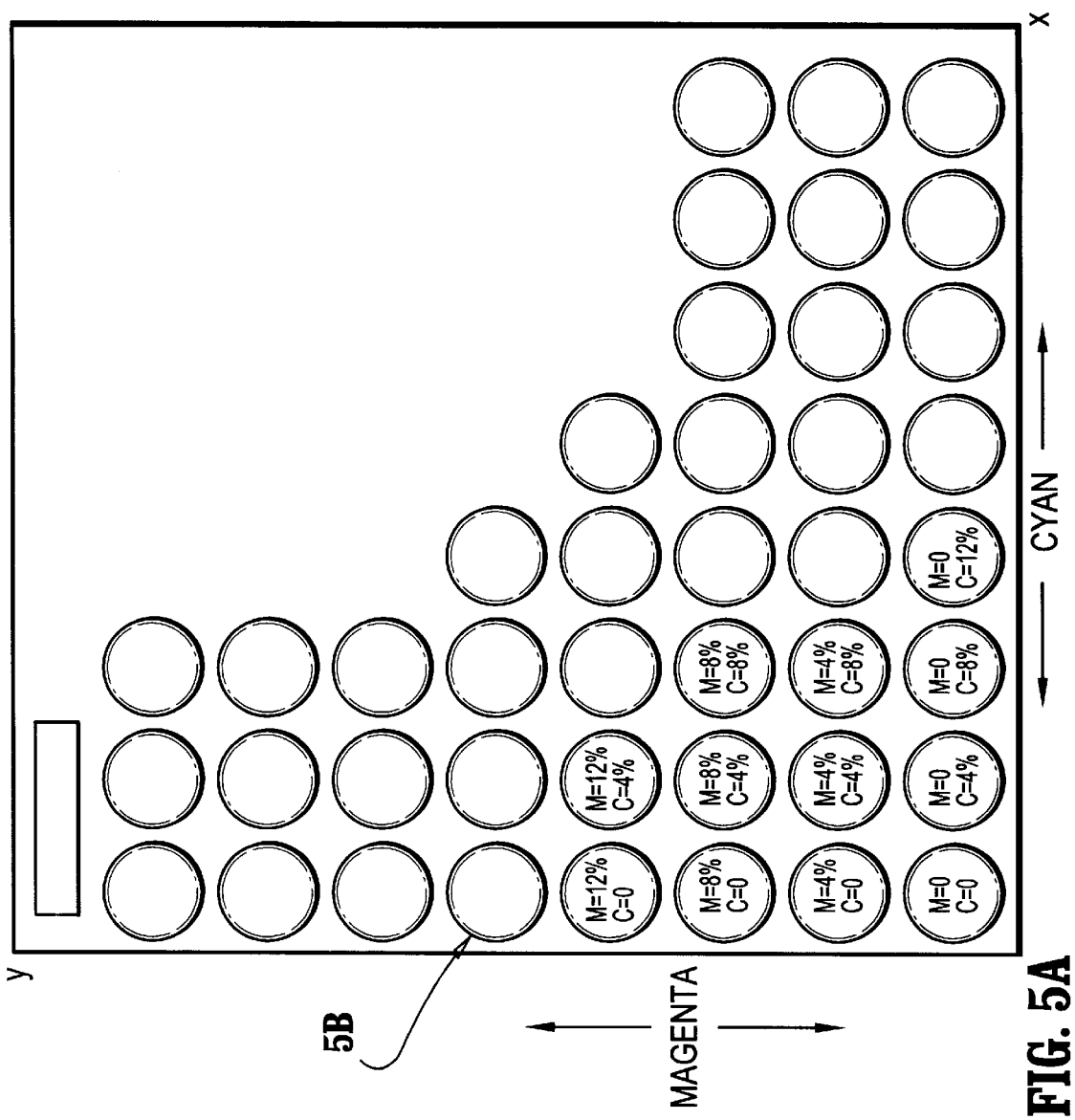
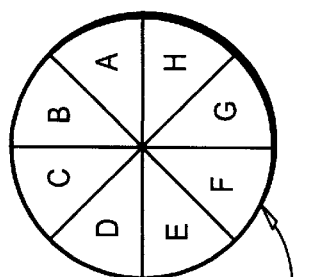
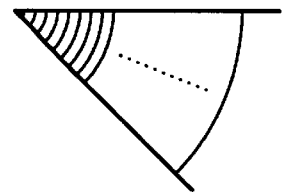
FIG. 5A
FIG. 5B
FIG. 6

DIGITAL IMAGING COLOR CALIBRATION

BACKGROUND OF THE INVENTION

1. Field of the Invention

The present invention relates to optimum color density and gamma curve determination and, more particularly, to a method and apparatus for determining the desired output characteristics of a color output device.

2. Related Art

In digital color output devices (e.g., monitors, ink jet printers, color presses, etc.), a color is described by a set of numbers that, when received by the output device from a host computer, will cause the output device to output a desired color. For example, in a color printing device the primary colors Cyan, Magenta and Yellow are combined in predefined combinations and amounts in order to make other colors. A predetermined set of numbers indicate to the printing device how much of each color is to be used to achieve a desired color.

However, in these types of color printers, the particular color printed depends not only on the set of numbers received from the host computer, but also on other factors such as, for example, the output characteristics of the printer itself. These output characteristics include variations in the purity of the colorants used, the order in which the colorants are applied, variations in the transparent properties of the colorants used and the characteristics of the substrate on which the colorants are applied just to name a few. Accordingly, there will generally be variations in the colors output from printer to printer or monitor to monitor, for example, when a static set of numbers are input to each device from a host computer. That is, a given set of numbers for Red, Green and Blue values will most likely produce a different color response on different color output devices (e.g., different monitors). A given CMYK value will most likely produce, for example, a different color on different CMYK printers. For this reason, RGB and CMYK color spaces are both said to be device dependent. The color output produced will depend at least to some extent on the particular output device used.

Because of the device dependence of the color space, the process of one output device (e.g., a printer) emulating the output of another output device is complicated. The term "emulation" is often defined, for example, as one output device (e.g., printer) having the same output or print characteristics as another device. These characteristics can be defined in subjective and objective terms. Subjective characteristics include terms of description such as "midtone punch", "flat", "vibrant" and "good shadow detail", for example. Objective characteristics that can be measured and defined are most commonly based on a standard which describes a set of objective standards of color print characteristics such as the "Standards for Web Offset Printing" (SWOP) publication. This objective set of standards uses terms such as "print contrast", "dot gain", and "gray balance", for example, to define print characteristics. If measured values of the output device fall within specified tolerances, the output device is said to be printing to SWOP specifications. Although SWOP does not necessarily define how a particular color will print, it does define generally how a particular printing device will operate. From this, an experienced printer operator will know roughly what a given CMYK value will produce if the printer or press is calibrated to SWOP. For purposes of discussion in the present application only, SWOP is defined as a device independent color printing standard.

There also exists a color matching system such as PANTONE, which consists of a series of reference inks. Standard methods exist for calculating PANTONE mixtures that simulate printer inks. Although a PANTONE color matching system does not use the same printing inks (C,M, Y,K) that an offset printing press would use, for example, it does specify the CMYK values that the PANTONE standard has determined are the closest match to a given PANTONE color. The published CMYK values of PANTONE can be loosely defined as yet another device independent standard that a CMYK device would try to emulate.

Presently, in order for an operator to calibrate a printer to a particular standard such as PANTONE, for example, the operator will input the CMYK values corresponding to the particular desired PANTONE color. The operator will then examine an output printed using those given values and, based on experience, vary one or more of the color values or calibration curves on a trial and error basis until a selected combination results in an output which sufficiently matches the desired PANTONE color. After the proper color values or calibration curves are determined by this trial and error process, the system can be recalibrated using those values to achieve the desired output. However, such trial and error processes are extremely tedious, time consuming and inefficient.

On the other hand, an operator may not always desire that the printer emulate another printer or standard. In this case, the response or output of the printer can be determined and set, for example, based on the manufacturer, customer or market demand. However, the operator must still perform a tedious trial and error process to derive the color values so that the system can be calibrated to achieve the desired output result.

Typical methods presently being used may attempt to achieve device independent color using an intermediate, independent color space such as CIELAB, or CIExyz between device dependent color spaces (e.g., between an RGB input device and a CMYK output device or between a CMYK device and another CMYK device). That is, a color input device such as a monitor which uses a device dependent color space such as RGB will go to a device independent color space such as CIE and then to another device dependent color space such as CMYK for output by a printer, for example. However, this process involves the use of complex transformation algorithms and procedures and the creation of such is technically out of reach of the typical everyday printer user.

U.S. Pat. No. 5,537,516 relates to a method of calibrating a color printer using a scanner for color measurements. A set of calibration curves are generated for correcting the color output of the color reproduction device. The calibration curves provide modification functions for each of the individual color print channels of the color reproduction device and are used to alter the rendering of color reproductions. However, this method requires a rather complicated and lengthy procedure to derive the printer calibration curves and requires an object printer/scanner and the generation of object targets and comparison data that are used to calibrate the subject printer/scanner systems. In addition, although this patent makes reference to "calibration curves", it does not provide any means or procedure to define what the optimal curves should be. For the dot gain and maximum density parameters to be set properly presently requires tedious trial and error processes.

U.S. Pat. No. 5,528,386 relates to a color printer calibration architecture for calibrating a printer to produce an accurate printer response based on a given ideal input image. A set of color patches are created, which include determined linearization and black addition, by printing and measuring patches of printer colors distributed throughout the color space. The color of each patch is measured using a spectrophotometer to determine color in terms of RGB values. The measured colors are used to build a three dimensional look-up-table relating RGB defined colors to CMY defined colors. Conversions that do not include mapped and measured points may be interpolated. The look-up table compensates for the addition of black. That is, if black is added, the measured RGB for the same CMY is much darker. Accordingly, to obtain the correct RGB, a lighter combination of CMY must be used. The '386 patent thus converts from device independent values to device dependent values in converting from RGB to CMY, by providing a lighter combination of CMY in the conversion. However, this device requires that the spectral characteristics be determined for the device in order to determine how the device will react. That is, the '386 patent attempts to understand how the output device will react in order to determine how to move from an RGB color space to the CMYK color space. Accordingly, although the intent of the '386 patent is to provide a calibration utility, it does not address optimization of the CMY curves. The desired print quality and characteristics produced by the '386 patent are achieved by creation of a transformation correction table that sits between a device dependent RGB color space of the scanner and a device dependent color space of the printer.

SUMMARY OF THE PRESENT INVENTION

The present application is directed to those types of output devices having the need to quickly modify the output print response (e.g., of a CMYK PostScript printer) so that a given set of input CMYK values matches a known, desired output, which desired output may or may not be consistent with a specific standard. The present invention also achieves device independence within multiple CMYK device dependent color spaces, otherwise known as device matching. Given the output of one device such as, for example, a CMYK printer, the present invention can be used to calibrate the correction curves of another CMYK printer to produce a substantially identical output.

According to one aspect of the present invention, a method is provided for determining optimum color density and gamma curves. The method comprises steps of providing a first set of input color values representing a set of Cyan, Magenta and Yellow values corresponding to a desired output color and steps of outputting an array of color output simulations using the first set of input color values as a starting point. The outputted array consists of a plurality of individual color samples having varying amounts of Cyan, Magenta and Yellow which differ from the first set of inputted color values by predetermined percentages. The sample which corresponds most closely with the desired output color is selected and the Cyan, Magenta and Yellow values corresponding to the sample are determined. In an adjusting step, gamma correction curves which are used to adjust the input color values are adjusted by using the determined Cyan, Magenta and Yellow values. The first set of input color values can be derived from a desired color, the desired color being selected from a predetermined standard such as the PANTONE color matching system or a predetermined standard such as SWOP, for example.

The outputting steps may comprise printing a plurality of combination color samples, each sample consisting of eight different combinations of Cyan, Magenta and Yellow. An eight by eight array of color samples can be printed. The eight by eight array can consist of eight rows and eight columns of color samples with one of the CMY values varying for each column and another of the CMY values varying for each row. Each sample can be further divided into eight segments, such that another of the CMY values varies for each segment. Preferably, the adjusting step adjusts the dot gain values of the gamma correction curves and/or the optimum maximum density values. The present invention is thus directed at a system for optimization of a printer without the need for tedious trial and error setting procedures.

BRIEF DESCRIPTION OF THE DRAWINGS

These and other aspects of the present invention will become apparent from the following descriptions to illustrate embodiments of the present invention when read in conjunction with the accompanying drawings in which:

FIG. 5A depicts a sample page showing variations in the dot gain or maximum density values for each of Cyan, Magenta and Yellow and FIG. 5B depicts an enlarged view of one of the samples; and FIG. 6 depicts an enlarged view of a segment of a color sample for a blend of colors.

DETAILED DESCRIPTION OF THE PREFERRED EMBODIMENTS

According to a first embodiment of the present invention, a calibration utility is provided for printing a plurality of colors showing the effects of adjustments to Dopt and Dot Gain settings.

Figure 4A:
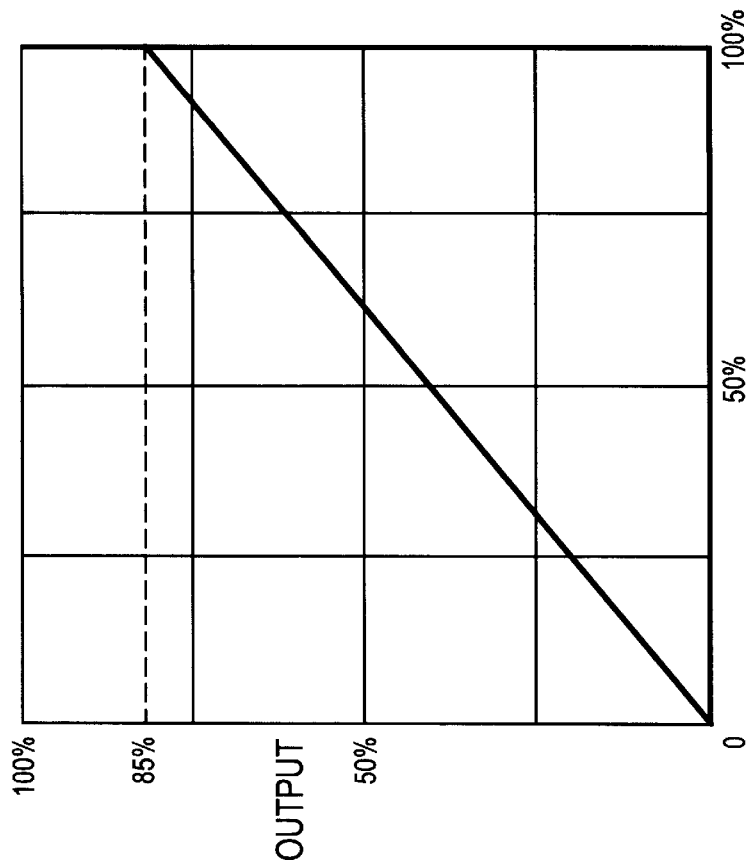
FIGS. 4A and 4B depict optimum maximum density adjustments.
Figure 4B:
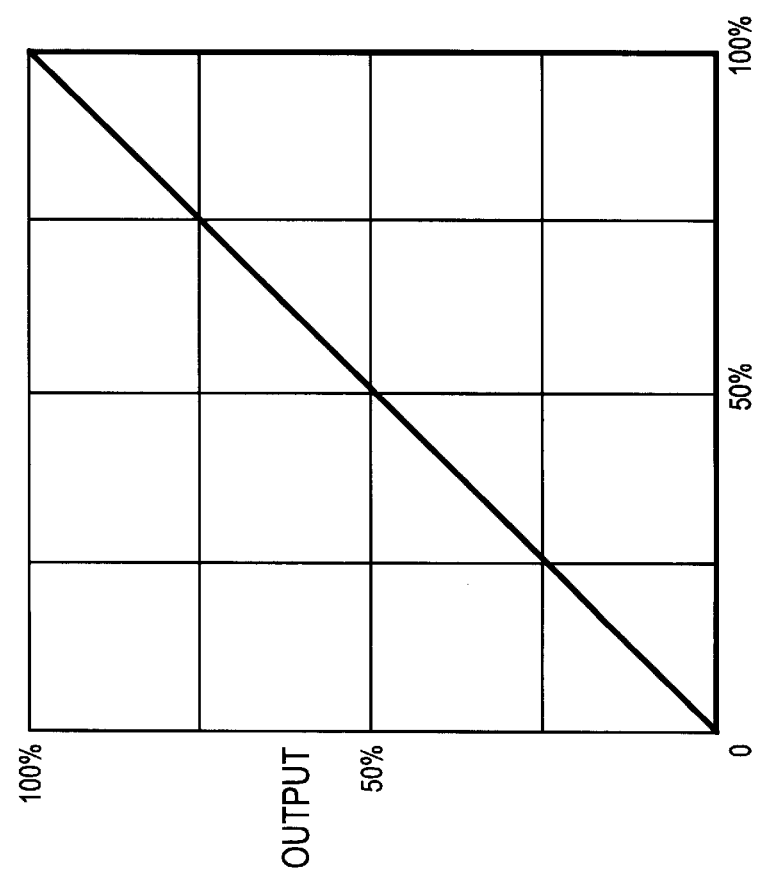

Dopt is defined as the optimum maximum level of colorant (e.g., toner, ink) that a device should print. This optimum maximum level may or may not be different than that which the output device is capable of outputting or printing. For example, as shown in FIG. 4A, the optimum maximum density is 100%. That is, maximum input yields maximum output. As shown in FIG. 4B, 100% maximum input only yields 85% maximum output.

Figure 3A:
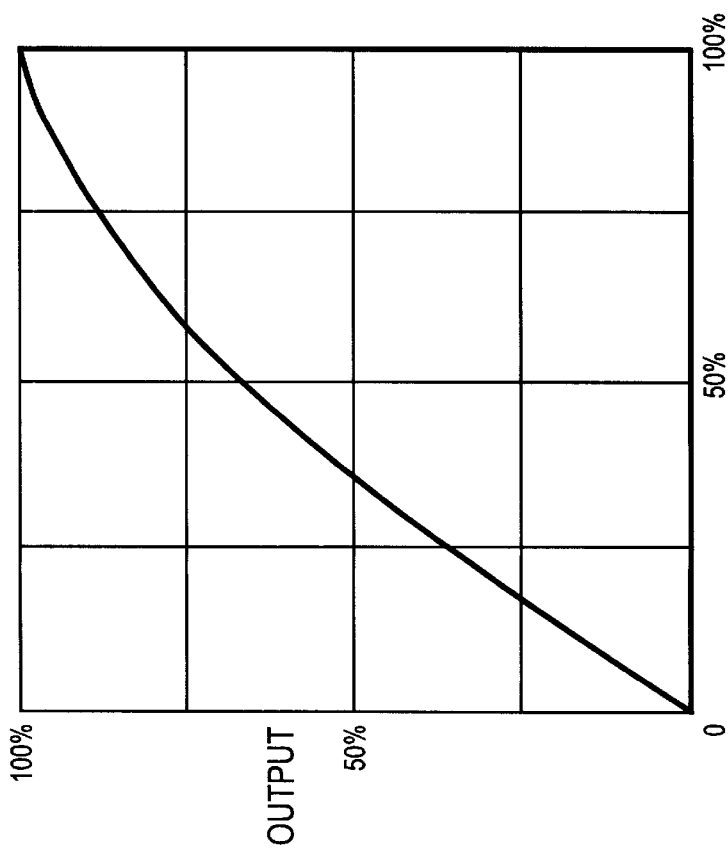
FIGS. 3A and 3B depict dot gain adjustment curves.
Figure 3B:
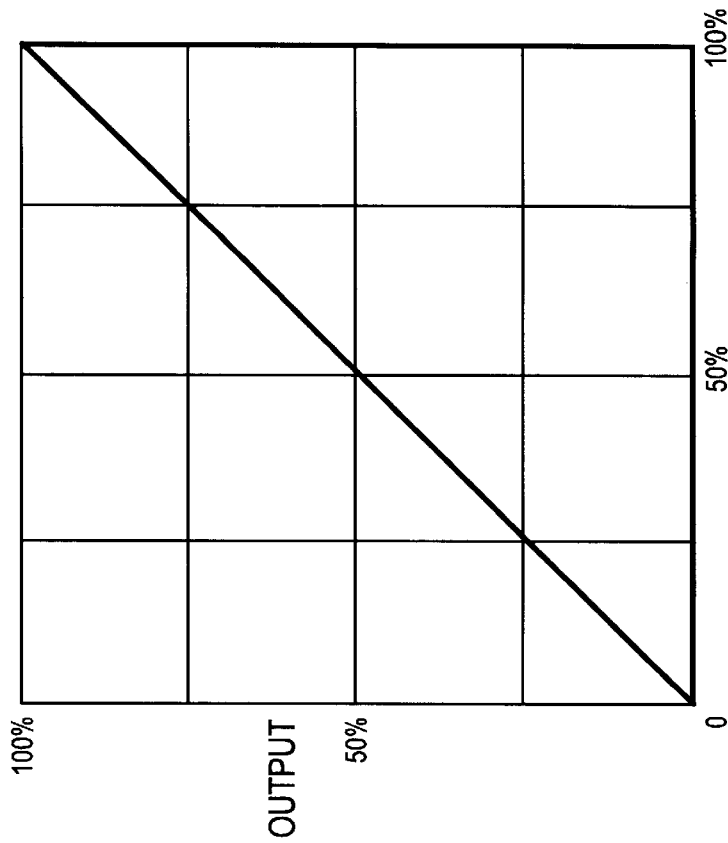

In many devices, the optimum maximum densities capable of being printed for each color are different in their default values. However, it may be desirable that the optimum maximum density values for each of Cyan, Magenta and Yellow be set to be the same. That is, it may be preferable that the Dopt values for each of Cyan, Magenta and Yellow be set so that the maximum optimum densities are the same for each color. In addition, printers often have a device limitation when they operate at maximum density. That is, often when a color is printed using the maximum density that the printer is capable of outputting, an ink scatter phenomenon may occur around the edges of the printed ink, possibly resulting in a blurry looking output. Accordingly, the operator may wish to lower the maximum density value (Dopt) that the printer will output for a particular color ink, by controlling the optimum maximum density value of the curve in order to avoid such ink scatter. By knowing the starting Status T Density value, and the predetermined percentage of reduction, the ideal or desired maximum optimum density value can be determined Dot gain is a well defined term of art and can refer to the amount of spread that will occur when an ink dot is placed on a sheet. However, as used in the present application, the term Dot Gain will be used to describe the amount of increase in the output of the colorant as compared to the amount requested (input). This can also be described as a gamma curve. Dot gain is defined as the difference between the input and output values as measured at 50% of the maximum input value. For example, as shown in FIG. 3A, the output curve is at 70% when the input is at 50%. Thus, the dot gain is said to be 20%. As illustrated in FIG. 3B, the dot gain is 0%. Adjustments to the optimum density (Dopt) and to the Dot Gain are used to modify the CMYK response of the output device (e.g., the printer output).

The present invention functions as a simulator that eliminates the time consuming procedure and guesswork involved in calibrating an output device (e.g., a PostScript printer) to a desired standard or quality using a calibration software utility.

Examples of devices to which the present invention would be applicable include the Fiery XJ Print Calibrator manufactured by Electronics For Imaging, Inc and Color Encore Print Calibrator by Southwest Software. Of course, other print calibrators can also be used, although slight variations in each calibrator's characteristics may need to be compensated for depending on the specific calibrator used. Calibrators typically include a calibration editing function for adjusting the calibration curves for each color. As described with respect to the Fiery XJ Print Calibrator, the optimum maximum density (Dopt) values for each of Cyan, Magenta, Yellow and Black can be set by the operator. In addition, the Dot Gain for each color can be set to North American standard or European standard and the Dot Gain value set as desired by the operator. Prior to the present invention, the operator would set these values to starting values (these starting values may be known starting values derived from a desired PANTONE color for example), for achieving a desired color output. However, due to the device dependence of the CMYK color space as described above, these set values will likely not produce the desired result. Accordingly the operator must print a test swatch using those values. Based on inspection of the printed output and the operator's experience, the operator then modifies one or more of these values (e.g., varies the Dopt and/or dot gain values for one or mor of Cyan, Magenta and Yellow) and prints another test swatch. This procedure would be repeated until the desired values were found.

The present invention avoids such trial and error processes. According to an embodiment of the present invention, the operator inputs the CMY values corresponding to the desired PANTONE color. The present invention then simulates and outputs 512 combinations of those colors and prints a simulated page. The operator, either by visual inspection or using a calorimeter, can then select the print output closest to the desired value. These values are then used as inputs to set the optimum maximum density values in the calibration editing function.

As noted above, two primary adjustments are involved according to the first embodiment of the present invention. The first adjustment relates to the maximum optimum density value (Dopt) and involves adjusting the height of the output curve at 100% input (e.g., see FIGS. 4A and 4B) as described above. The second adjustment relates to dot gain and involves adjusting the "bow" of the curve (e.g., see FIGS. 3A and 3B). With the present invention, an operator is able to modify these curves for each of Cyan, Magenta and Yellow so that the device will operate at a desired level. By modifying what the CMYK printer does with a static CMYK value provided by the host computer, the input values need not be modified or adjusted to achieve desired results.

An embodiment of the present invention can be implemented in the form of several downloadable PostScript programs which can be interpreted by a PostScript controller and printed on a CMYK printer. According to this embodiment of the present invention, two adjustments are made within the PostScript program to alter the output in a way that simulates the effect of applying a calibration correction curve to the PostScript interpreter.

The first adjustment is to the maximum optimum density (Dopt) setting and involves decreasing the maximum level of a colorant by a certain percentage. For example, instead of printing 100% of the maximum of a particular colorant that the printing device can produce, the percentage is incrementally reduced by a predetermined percentage (e.g., 2%). The Murray-Davies equation, which is well known in the art, can be used to determine a desired output given an input value. The question to be answered here is, given a percentage reduction from the Max (100%) and knowing the density value at 100%, what would the density be for the new, reduced percentage? The present invention uses a simple, yet acceptably accurate method to determine a theoretical density of a given requested input percentage of the maximum density that the printer can produce. The formula used is $D=-\log(1.0-Rd)*(1.0-(inv \log-Dmax))$. The portion of the formula (inv log-Dmax) uses the inverse of the formula $D=-\log R$, where D is density and R is reflectance. For example, a reflectance of 50% (0.50) is equal to a density of 0.3. Dmax is entered and represents the maximum density that the printer can produce for each color. For a CMYK printer, there would be four Dmax values, one for each of Cyan, Magenta, Yellow and Black. This portion of the formula determines reflectance for a given density. For purposes of the present invention, it is assumed that 100% reflectance occurs at 0.0 density and 0% reflectance occurs at 4.0 Density. Where 0% density occurs can vary and the selected value will effect the accuracy of the results. This answers the question if one starts with maximum density of D, and reduces it by some value, what is the reflectance. The portion of the equation (1.0-(a)), where (a) is (inv log-Dmax), accounts for the fact that a request to print ink of toner is the inverse of the reflection. That is, 100% reflection means that no color existed so 0% was printed. If reflectance is 0%, then theoretically, 100% was requested to print.

The second adjustment is made to the "Dot Gain". Given a new set of CMY values, the dot gains and corresponding gamma curves for each color can be derived. The Dot Gain curve can be calculated using the mathematical expression New Output Value=(((requested input %−0.5)2)*−4)* gain+ gain+requested input value, with all values entered as decimal values. The formula can be defined in PostScript, for example, by the function of ov(ir)=ir 0.5 sub2 exp−4 mul dg mul dg add ir add, where ov is the resultant output percentage, ir is the requested input percentage (static), and dg is the dot gain varied by a predefined amount. From this equation it will be appreciated by a person skilled in the art, for example, that given a static input Cyan value of 50% and dot gain of 10%, the output value would be 60%. If given a static input Cyan value of 40%, for example, the output value would be 49.6%.

PostScript, for example, due to its device independent nature, does not request colors as absolute values such as Status T Densities, but requests color as a percentage of whatever limit the CMYK printer is capable of printing due to either its own physical constraints, or an artificial software constraint such as calibration. For example, if the printer's maximum Cyan density is 1.5, then 100% Cyan would print 1.5. If 95% Cyan is requested, then 95% of maximum density would be printed. (This is not computed as simply 1.5×0.95, but instead is computed using the Murray-Davies equation.) Accordingly, as described above, the basic function of the present invention is to modify what the printer will do with the static relative input values specified by the operator by use of the modified density curves derived by the present invention.

The utilities according to the present invention modify relative input CMYK values as follows. An initial CMY value represents a desired output. For example, an operator may wish to match a particular PANTONE color. In the alternative, an operator may wish to simulate SWOP. However, due to the device dependence of the CMY color space, the printer being used will likely not print a desired color for a static CMY value. To compensate for these variations, the CMY values corresponding to a desired output are input to the present invention and an output page of color samples printed. The operator then selects the color sample closest to the desired color, and uses the CMY values corresponding thereto to modify the density curves for each of the CMY values.

More specifically, initially, the specified CMY value is input by an operator, for example. An eight-by-eight array of color circles are then printed on a page. FIG. 5A depicts a portion of a sample of a test output page showing changes in the dot gain for each of Cyan, Magenta and Yellow. A test output page showing changes in the optimum maximum density for each of Cyan, Magenta and Yellow would, in black and white, look similar to that shown in FIG. 5A. Of course, in actuality, each circle is color and depicts different combinations of CMY values. As shown in FIG. 5A, eight color circles are printed by the printer across a page from left to right along the X axis. Each successive circle reduces or increases the specified input value by a predefined amount also input by the operator. For example, if printing a dot gain sample page, the dot gain may be increased from 0% to 28% in 4% increments. If printing an optimum maximum density sample page, for example, the maximum density values can vary from 1.81 to 1.074, for example, in predefined increments. According to this embodiment of the present invention, the X-axis represents changes in the Cyan value. That is, each circle along a row has a different Cyan value. The row of eight circles is repeated up the page for a total of eight rows to the top of the page. Thus, all of the circles in a given column have an identical Cyan value (C, as shown in FIG. 5A), with each successive column having its given Cyan value changed by an incremental amount which was input by the operator (4% in this case). Each successive row up the page in the Y axis direction changes the Magenta input value. Thus, all of the circles in a given row have an identical Magenta value (M, as shown in FIG. 5A), with each successive row having its Magenta value changed by the incremental amount input by the operator (in this case 4%).

Accordingly, 64 color circles are produced on a page, with the bottom left hand corner circle representing 0% Cyan dot gain change and 0% Magenta dot gain change. The top right hand corner circle simulates a maximum Cyan dot gain change and a maximum Magenta dot gain change, which in this case would be 24% dot gain for each of Cyan and Magenta. 64 different possible combinations of Cyan and Magenta adjustments and their effects are thus displayed. The third color, yellow, is varied in a counterclockwise direction around each circle. That is, as shown in FIG. 5B, each circle is divided into eight "slices" (A–H as shown in FIG. 5B), showing eight possible changes in yellow dot gain (or maximum optimum density), for each Cyan, Magenta circle. Preferably, the incremental amount of change for the Cyan, Magenta and Yellow values are the same. However, it is of course possible to vary the percentage that each color will change so that they are different. A similar page of outputs can be printed to simulate changes in the optimum maximum density values. In this case, the maximum density values would decrease from the lower left hand corner when moving up and across the page. That is, the lower left hand corner would show a maximum optimum Cyan density value and a maximum optimum Magenta density value. The upper right hand corner would show a minimum optimum Cyan density value and a minimum optimum Magenta density value. Each circle would also be divided into eight "slices", showing eight possible changes in yellow optimum maximum density for each Cyan, Magenta circle.

Therefore, one page of samples produces 512 combinations of colors. The operator can then choose the sample that best matches the desired output. This can be done by visual inspection by the operator visually comparing the printout with the desired color or by use of a colorimeter. The sample chosen indicates the simulated adjustments made to the CMYK printer response. These adjusted values can then be entered into the calibration utility to modify the density curves for each of Cyan, Magenta and Yellow for permanent storage. When a CMYK value is then requested from the host application, the resultant printed color will match a desired output. The procedure for reading the page of circles is the same for Dopt and Dot Gain adjustments. The utilities can be used dependently or independently. That is, normally the maximum optimum density value Dopt would first be determined using the above-described method and then the dot gain would be determined. Of course, each can be determined alone without the need to determine the other, if desired.

Algorithms will now be described for printing the color circle test pages. According to the described embodiments, the present application makes reference to the use of the PostScript programming language. However, it should be understood that other programming languages would be equally applicable, particularly other page description languages.

Figure 1:
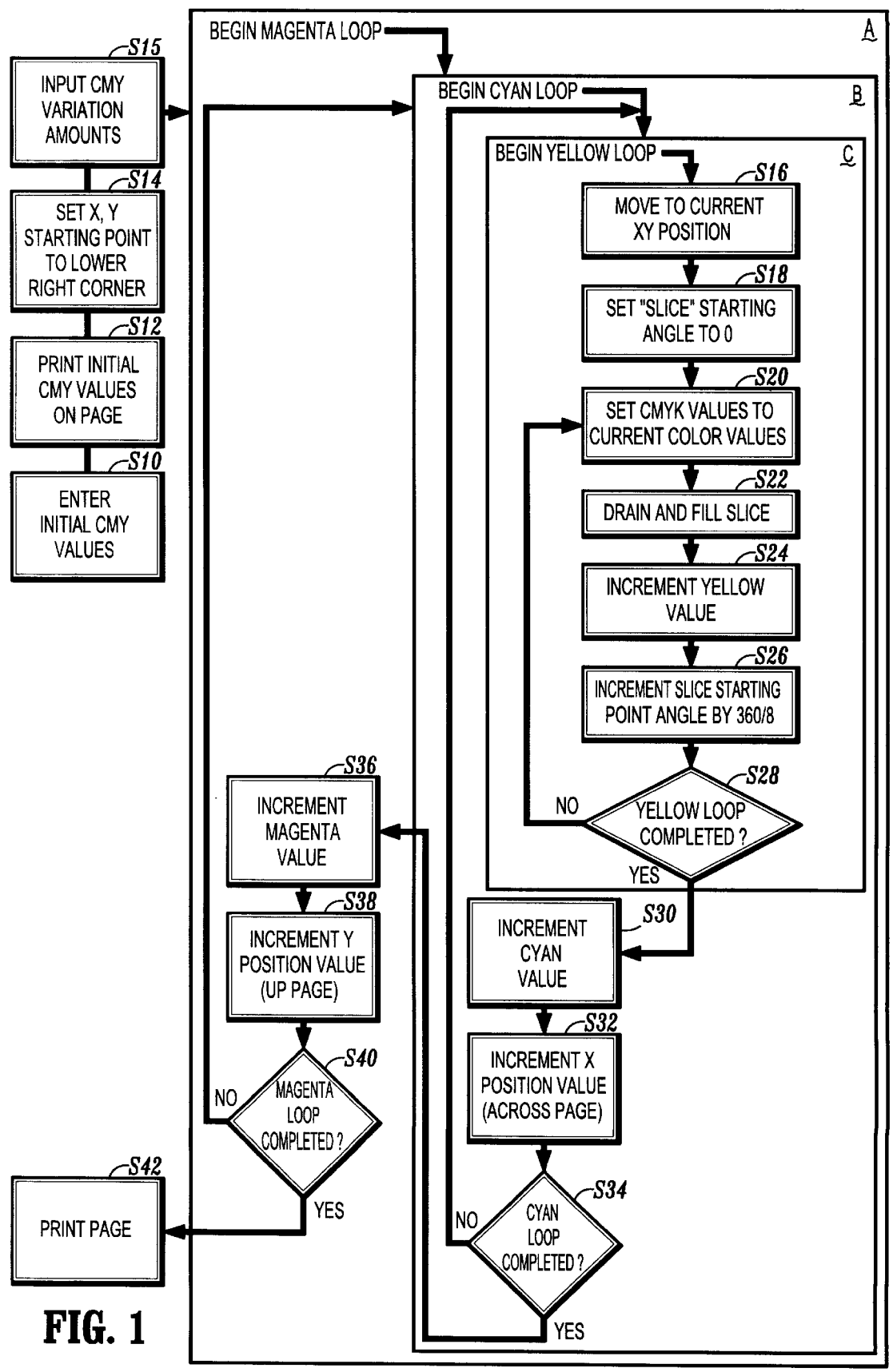
FIG. 1 depicts a general program algorithm for outputting a sample spot color page for determining optimum maximum density or dot gain values.

FIG. 1 depicts a flow chart of a general program algorithm for spot color. That is, this program simulates 512 combinations of colors and is used to determine the CMY value that most closely matches a desired color. In step S10, the operator enters original CMY values to be printed. These values can be derived from a desired PANTONE color, for example. The original CMY values are printed in a box along the top of the page in step S12 (e.g., see FIG. 5A). In step S14, the X,Y starting point (i.e., the position on the paper at which the first circle is to be printed) is set to the lower left hand corner. Blocks A, B, and C in FIG. 1 represent a "Magenta loop", "Cyan loop" and "Yellow Loop", respectively. In step S16 of yellow loop C, the print head is moved to the currently set X,Y starting point (i.e., the lower left hand corner of the page according to this embodiment of the present invention). The slice starting angle is set to 0 degrees in step S18 (e.g., for filling in the slice of the sample circle between 0–45 degrees). In step S20, the CMY colors are set to the current color values. In step S22, the first circle is printed or drawn and the first slice is filled using the CMY current color values. In step S24, the yellow value is incremented by the value input in step S14. In step S26, the slice starting point angle is incremented by 360/8 (i.e., according to this embodiment of the present invention, the circle is divided into 8 slices and therefore, the next slice would be between 45–90 degrees). In step S28, it is determined whether all 8 slices have been filled (i.e., whether the yellow loop for this circle is complete). If Yes, the process proceeds to the Cyan loop B. If No, the process returns to step S20 and the CMY colors are set to the current color values (i.e., the C and M values remain the same and the newly incremented Y value is set). Steps S20–S28 are repeated until all "slices" in the first circle have been filled. After all slices have been filled, in step S30 the Cyan value is varied by the value input in step S14. (If printing a dot gain sample page, the Cyan dot gain value is increased by the input value set by the operator. If printing a maximum optimum density sample page, the Cyan maximum density value is decreased by the value input by the operator.) In step S32, the X position value is incremented (i.e., to the next circle position across the page). In step S34, a determination is made whether the Cyan loop is complete (i.e., whether the row of 8 circles in the first row are completely filled). If No, the process returns to step S16, where the yellow loop is repeated using the new Cyan value until each slice of the circle is filled. If Yes in step S34 (i.e., the row is complete), the process proceeds to step S36 in which the magenta value is varied by the predetermined amount input in step S14. (If printing a dot gain sample page, the magenta maximum density value is increased by the input value set by the operator. If printing a maximum optimum density sample page, the Magenta maximum density value is decreased by the value input by the operator.) In step S38, the Y position value is incremented (i.e., to the next row up the page). In step S40, a determination is made whether the Magenta loop is complete. If No, the process returns to the top of loop B to begin the Cyan loop again using the new Magenta value. If Yes, the sample page is outputted.

Figure 2:
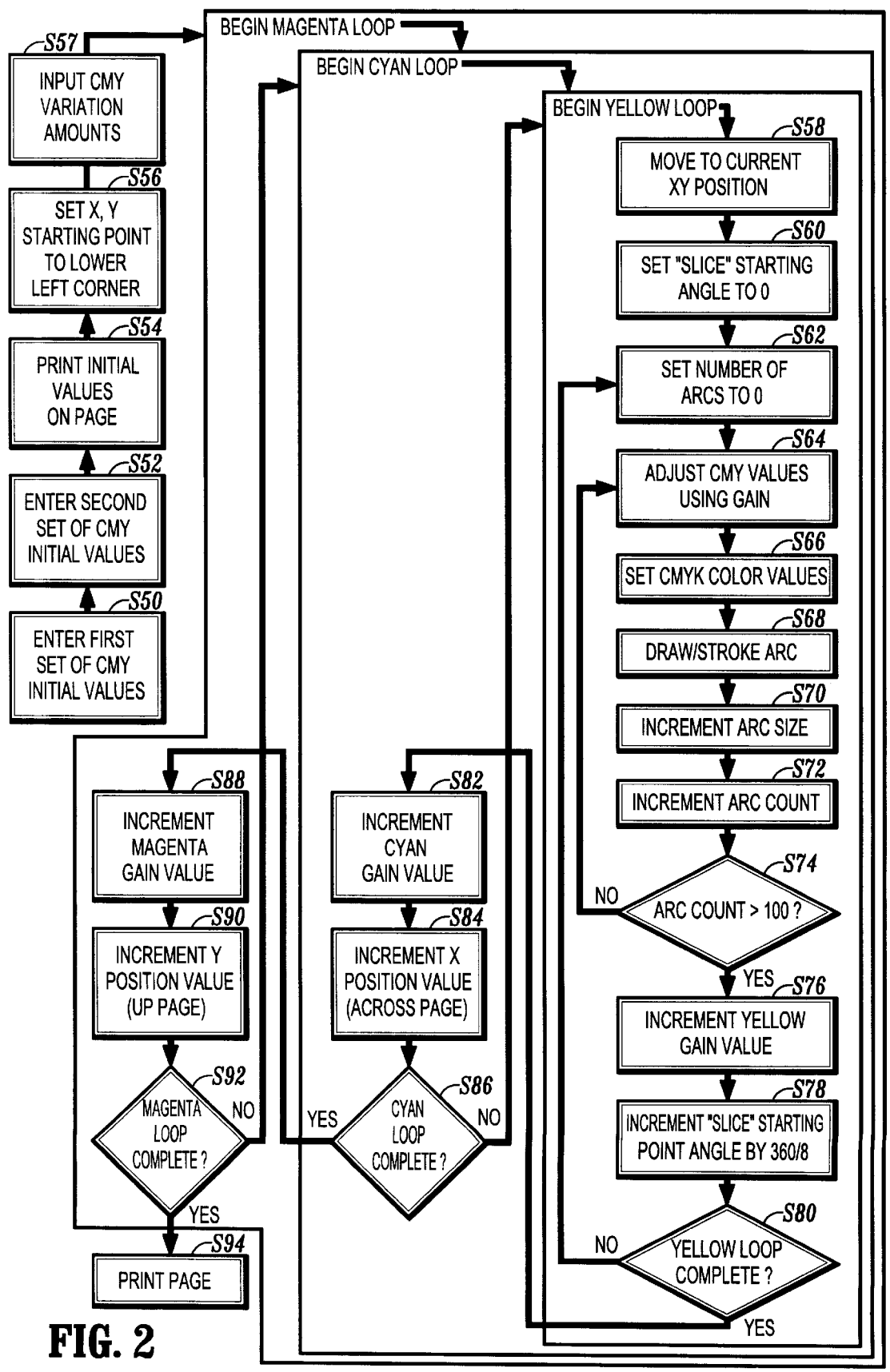
FIG. 2 depicts another general program algorithm for outputting a color blend sample page for determining optimum maximum density or dot gain values.

It may be desirable to view samples of colors in a blend, so that the operator can determine which color values will achieve the smoothest blend from color to color. Accordingly, FIG. 2 depicts a flow chart of a general program for an algorithm for simulating blends of colors. As shown in an enlarged view in FIG. 6, in this algorithm, when 100 1 pt lines (Arcs) are printed adjacent to one another, the lines are no longer distinct and will result in the appearance of a smooth blend from one color to another color. According to this embodiment, a first color originates from the center of the circle where it prints out at 100% (maximum density or dot gain) and diminishes as it progresses outward. Color 2 originates from the outside os the circle where it prints at 100% (maximum density or dot gain) and diminishes as it progresses inward. In step S50, the operator enters the first set of CMY values. In step S52, the operator enters the second set of CMY values. In step S54, these original values are printed in boxes at the top of the page. In step S56, the X,Y starting points are set to the lower left hand corner of the page to be printed and increment values are input by the operator indicating the incremental amount that each color will increase or decrease. The process then proceeds to the yellow loop and step S58, in which the starting position for the first circle is moved to the current X,Y position. In step S60, the slice starting angle is set to 0 degrees (e.g., the slice between 0–45 degrees). In step S62, the number of arcs to be printed for each color is set to zero. In step S64, the CMY values are adjusted using the increment values input in step S56 and in step S66 the CMY color values are set. In step S68, an Arc is drawn using the set color values. In step S70, the Arc size is incremented and in step S72, the Arc number is incremented. In Step S74, a determination is made whether the Arc number is greater than 100 (of course, the number of arcs can be set to more or less than 100 depending on the resolution required). If No, the process returns to step S64 where the CMY values are adjusted using the values input in step S56, the CMYK colors set in step S66 and the next Arc drawn in step S68. This process repeats until all of the Arcs for that slice of that circle are filled. To achieve the look of a blend, one of the colors (e.g., Cyan) will vary in increments from 0% at the center to 100% at the outermost arc. Another of the colors (e.g., Magenta) will vary in increments from 100% at the center to 0% at the outermost arc. This will produce 100% Magenta (and an amount of Yellow if desired) transitioning to a combination of Cyan and Magenta (and Yellow), then turning to pure Cyan (and an amount of Yellow if desired) at the outermost edge of the circle. When Arc number 100 is complete, (i.e., a yes in step S74) the process proceeds to step S76 where the yellow gain value is incremented. In step S78, the slice starting point angle is incremented by 360/8. In step S80 a determination is made whether the yellow loop is complete (i.e., whether all of the arcs in each slice of the circle have been filled.). If No, the process returns to step S62 where the number of Arcs is once again set to zero and steps S64–S80 are repeated until the result of Step S80 is Yes. The process then proceeds to step S82 where the Cyan gain value is incremented. In step S84, the X position value is incremented (i.e., the next circle across the page is started.). In this case, the dot gain is applied such that 100% still prints at 100% and 0% still prints at 0%. However, 50% would now print at 52%, for example). All other inbetween values would then be adjusted accordingly. In step S86 a determination is made whether the Cyan loop is complete. If no, the process returns to the top of the yellow loop (step S58). If yes in step S86, the Magenta gain value is incremented in step S88. The Y position value is then incremented in Step S90 (i.e., moved up the page to the next row of circles). In step S92 a determination is made whether the magenta loop is complete (i.e., whether all circles in all of the rows have been filled). If no, the process returns to step S58. If Yes, the page is printed in Step S94.

The above-described methods can be applied in several manners. A first manner applies to both Dot Gain and optimum maximum density (Dopt) adjustments. This tests the effects of the adjustments on spot (e.g., single) colors. A second approach applies to dot gain only. That is, dot gain modification is applied across a range of color values, for example, 100% Cyan down to 0% Cyan. This is commonly referred to as a blend. The present invention is capable of producing a blend from any one color to any other color.

The above-described utilities and procedures have several spot color uses. The first use is for single color matching. It is common for a CMYK printer operator to need to match a particular color included in a standard color matching system (e.g., a PANTONE color matching system). By knowing the CMYK values corresponding to a specified PANTONE reference color, an operator using the present invention can enter these CMYK values as initial values and determine what calibration correction curves need to be applied to those input values to achieve a color closest to the PANTONE reference color.

Another use of spot color is for matching general printer response to that of another printer (actual or theoretical).

Generally, gray balance is the science in which CMY colors are examined and understood such that at a given neutral color density (gray), the percentage of each toner (CMY) needed to produce that gray is known. These percentages may vary with density. Gray balance is the focal point of press calibration and is used extensively in the photographic developing industry. The CMY input values can be derived by determining a gray balance definition of the output device to be emulated. For example, if the SWOP printer prints a perfect gray at Cyan 50%, Magenta 40% and yellow 40%, then these values would become the initial input values for the present invention. The required settings of the calibration utility would correspond to the color circle that looks to the operator the most gray (neutral) on the output page. When these settings are applied to the calibration utility, the subsequent prints produce a tonal quality in the mid-tones (near 50%) similar to that of the printer to be matched.

Another use is for matching another CMYK printer when its gray balance definition is not known. If a CMYK image file is given, along with an ideal print, the ideal printer calibration settings can be approximated. This can be done by examining the image data and selecting two colors exclusive of each other, for example, by finding a Green (Cyan and Yellow) and a Blue (Cyan and Magenta) in the image file and inputting those values into the present invention. First, the Cyan and Yellow values are input and a first page of color circles printed. In this case, the magenta value would remain zero. Accordingly, the color circles would be modified such that the Cyan values vary along the X-axis and the Yellow values vary along the Y-axis. Then, the Cyan and Magenta values would be input as initial values and a second page of color circles printed. In this case, the Yellow value is zero. Accordingly, the color circles could be modified on the page such that the Cyan values vary along the X-axis and the Magenta values vary along the Y-axis. The first output page of color circles is then examined to see which Dot Gain setting best matches the Green. The Cyan value for that circle is noted and is used while examining the second page showing the blue variations. For example, if the dot gain settings that showed the closest match to the Green had values of Cyan 12% and Yellow of 17% for the optimum values, the second page of color circles (showing the blue variations) would be examined to find the best optimum Magenta value that also uses Cyan of 12%. This gives an optimum Magenta value, a Cyan of 12% and a yellow of 17%. When these optimum values are entered into the calibration utility, the printer will provide a print of this image file which is strikingly similar to the previously printed page that was to be matched.

Another use is for defining the complete optimal calibration settings procedure. This is accomplished by the following procedure. Any initial calibration is removed. The maximum densities for each color are then determined by printing 100% of each color and measuring the results with a densitometer. These maximum values are then entered as initial values and a Dopt test page is printed. The page is examined to determine optimal densities (e.g., as determined by the operator). The new optimum density values are then entered into the calibration utility and the printer is calibrated to a 0% dot gain. The ideal gray value is then determined. For example, the ideal gray value is defined by the characteristics of the output device that needs to be emulated (either theoretical or actual). For example, if the user wants to print like a SWOP calibrated printing press he can determine the gray balance of the press by reference to the written specifications and use this as the gray balance. On the other hand, a user may desire that the colors combine as close to theory as possible, meaning that equal amounts of colorant produce a perfect gray. The CMY values corresponding to the ideal Gray are then entered as initial values and a Dot Gain test page is printed. Preferably, it is best to print ideal gray values at different densities, such as quarter-tones, mid-tones and three-quarter-tones. The printed page (s) is examined to determine which dot gain adjustments are required to obtain (or retain) an ideal gray. These values are then entered into the calibration utility, leaving the optimum densities the same, and the system is recalibrated.

The above-described utilities and procedures have many blend uses also, several of which are now described. For example, the present invention can be used to determine which dot gain settings will produce a desired output. In addition, the present invention can be used to specify one color to be CMY at 100% and the second to be CMY at 0% (white) using the algorithm shown in FIG. 2. This will produce a "gray scale" that can be useful in determining optimal dot gain settings needed to produce a neutral gray balance across the entire range. The operator can "fine tune" an area to gray balance by tightening the range. For example, by setting CMY at 25% and CMY at 0%. This will focus on the lighter color balance of the print.

The printed sample page(s) can then be readily reviewed by the user to determine the optimum maximum density and the optimum dot gain value settings. For example, for dot gain, if doing midtone gray balance, the user would find the color combination that yields the most neutral gray (no color cast). If matching a color such as a Pantone color, the user would find a color patch that best matches the desired color. For optimum maximum density values, similar examinations are performed.

This invention may be conveniently implemented using a conventional general purpose digital computer or microprocessor programmed according to the teachings of the present specification, as will be apparent to those skilled in the computer art. Appropriate software coding can be readily be prepared by skilled programmers based on the teachings of the present disclosure, as will be apparent to those skilled in the software art. The invention may also be implemented by the preparation of application specific integrated circuits or by interconnecting an appropriate network of conventional circuits, as will be readily apparent to those skilled in the art.

It is understood that the embodiments described herein are merely exemplary of the principles of the invention, and that a person skilled in the art may make many variations and modifications without departing from the spirit and scope of the invention. All such variations and modifications are intended to be included within the scope of the invention as defined in the appended claims.

What is claimed is:

1. A print utility allowing an end user to adjust gamma correction curves, said utility comprising steps of:

inputting a first set of color values representing a set of Cyan, Magenta and Yellow values corresponding to a desired output color;

outputting an array of color output simulations using the first set of color values, the array consisting of a plurality of individual color samples having varying amounts of Cyan, Magenta and Yellow which differ by predetermined percentages, the output array including information identifying the varying amounts of Cyan, Magenta and Yellow of each individual color sample, said outputting step varying an optimum maximum density value of each of Cyan, Magenta and Yellow by a predetermined amount for each color sample;

selecting the sample which corresponds most closely with the desired output color and determining from the identifying information optimum maximum density values for the Cyan, Magenta and Yellow values corresponding to the selected sample; and adjusting gamma correction curves which are used to adjust input color values by using the determined optimum maximum density values for the Cyan, Magenta and Yellow values corresponding to the selected sample to alter the optimum maximum density value for each input color value by a predetermined amount.

2. A print utility as recited in claim 1, wherein the first set of color input values are derived from a desired color, the desired color being selected from a predetermined standard.

3. A print utility as recited in claim 2, wherein the predetermined standard is the PANTONE color matching system.

4. A print utility as recited in claim 2, wherein the predetermined standard is SWOP.

5. A print utility as recited in claim 1, wherein the outputting step comprises printing a plurality of combination color samples, each sample consisting of eight different combinations of Cyan, Magenta and Yellow.

6. A print utility as recited in claim 5, wherein the outputting step comprises printing an eight by eight array of color samples.

7. A print utility as recited in claim 6, wherein the eight by eight array consists of eight rows and eight columns and wherein at least one of the CMY values varies for each column and another of the CMY values varies for each row.

8. A print utility as recited in claim 7, wherein each sample is further divided into a plurality of segments, and another of the CMY values varies for each segment.

9. A print utility as recited in claim 1, wherein the adjusting step adjusts the dot gain values of the gamma correction curves.

10. A print utility as recited in claim 1, wherein said outputting step comprises varying the dot gain of each input color value by a predetermined amount for each color sample.

11. A print utility as recited in claim 10, wherein said adjusting step comprises altering the dot gain for each of the gamma correction curves based in the selected sample.

12. A print utility as recited in claim 1, wherein the adjusting step adjusts the optimum maximum density values of the gamma correction curves.

13. A print utility allowing an end user to perform spot color dot gain adjustment, said utility comprising the steps of:

inputting a first set of color values representing a set of Cyan, Magenta and Yellow values (CMY values) that correspond to a desired output value;

outputting an array of color output simulations using the first set of color values, the array consisting of a plurality of individual color samples having varying amounts of Cyan, Magenta and Yellow which differ by predetermined percentages, the output array including information identifying the varying amounts of Cyan, Magenta and Yellow of each individual color sample, the outputting step printing an array of combinations of color samples, each sample consisting of different combinations of Cyan, Magenta and Yellow, the array including rows and columns, wherein an optimum maximum density value of at least one of the CMY values varies for each column and an optimum maximum density value of another of the CMY values varies for each row;

selecting a sample which corresponds most closely with the desired output color and deriving optimum maximum density values for the Cyan, Magenta and Yellow values corresponding to the selected sample from the identifying information; and adjusting gamma correction curves for each of Cyan, Magenta and Yellow using the derived optimum maximum density values for the Cyan, Magenta and Yellow values corresponding to the selected sample, the gamma correction curves being used to adjust the color input values.

14. A print utility as recited in claim 13, wherein a spot color dot gain adjustment is performed by using the derived CMY values to adjust the dot gain for each of the CMY curves.

15. A print utility as recited in claim 13, wherein a maximum optimum density is adjusted for each color by using the derived CMY values to adjust the maximum density for each of the CMY curves.

16. A print utility allowing an end user to adjust gamma correction curves, said utility comprising steps of:

inputting a first set of color values corresponding to a desired output color;

outputting an array of color output simulations using the first set of color values, the array consisting of a plurality of individual color samples having varying amounts of colors which differ by predetermined percentages, the outputting step varying an optimum maximum density value of each input color value by a predetermined amount for each sample;

selecting the sample which corresponds most closely with the desired output color and determining optimum maximum density values for each color from the selected sample; and adjusting gamma correction curves which are used to adjust input color values by using the determined optimum maximum density values for each color from the selected sample.

17. A print utility allowing an end user to adjust gamma correction curves, said utility comprising steps of:

inputting a first set of color values representing a set of colors used to output a desired output color;

outputting an array of color output simulations using the first set of color values, the array consisting of a plurality of individual color samples having varying amounts of colors which differ by predetermined percentages, the outputting step outputting an array including a plurality of combination color samples, each sample consisting of different optimum maximum density values of combinations of colors, the array consisting of rows and columns and wherein an optimum maximum density value of at least one of the color values varies for each column and an optimum maximum density value of another of the color values varies for each row;

selecting the sample which corresponds most closely with the desired output color and determining optimum maximum density values of the selected sample; and adjusting gamma correction curves which are used to adjust input color values by using the determined optimum maximum density values of the selected sample.

18. A print utility as recited in claim 17, wherein each sample is further divided into a plurality of segments, and wherein an optimum maximum density value of another of the color values varies for each of the plurality of segments.

19. A print utility allowing an end user to perform spot color dot gain adjustment, said utility comprising the steps of:
   inputting a first set of color values representing a set of colors that correspond to a desired output value;
   outputting an array of color output simulations using the first set of color values, the array consisting of a plurality of individual color samples having varying amounts of the colors and which differ by predetermined percentages, the outputting step outputting an array of combinations of color samples, each sample consisting of different combinations of colors, the array including rows and columns, wherein a dot gain of at least one of the color values varies for each column and a dot gain of another of the color values varies for each row;
   selecting a sample which corresponds most closely with the desired output color and deriving dot gains of the resulting color values corresponding to the selected sample; and
   adjusting gamma correction curves for each of the colors using the derived dot gains of the resulting color values corresponding to the selected sample, the gamma correction curves being used to adjust the color input values.

20. A computer readable medium containing a print utility allowing an end user to adjust gamma correction curves, said computer readable medium comprising instructions for:
   receiving a first set of color values representing a set of Cyan, Magenta and Yellow values corresponding to a desired output color;
   outputting an array of color output simulations using the first set of color values, the array consisting of a plurality of individual color samples having varying amounts of Cyan, Magenta and Yellow which differ by predetermined percentages, the output array including information identifying the varying amounts of Cyan, Magenta and Yellow of each individual color sample, said outputting step varying an optimum maximum density value of each of Cyan, Magenta and Yellow by a predetermined amount for each color sample;
   receiving information indicating a selected sample which corresponds most closely with the desired output color;
   identifying optimum maximum density values for the Cyan, Magenta and Yellow values corresponding to the selected sample; and
   adjusting gamma correction curves which are used to adjust input color values by using the identified optimum maximum density values for the Cyan, Magenta and Yellow values corresponding to the selected sample to alter the optimum maximum density value for each input color value by a predetermined amount.

21. A computer readable medium containing a print utility allowing an end user to perform spot color dot gain adjustment, said computer readable medium comprising instructions for:
   receiving a first set of color values representing a set of Cyan, Magenta and Yellow values (CMY values) that correspond to a desired output value;
   outputting an array of color output simulations using the first set of color values, the array consisting of a plurality of individual color samples having varying amounts of Cyan, Magenta and Yellow which differ by predetermined percentages, the output array including information identifying the varying amounts of Cyan, Magenta and Yellow of each individual color sample, wherein an array of combinations of color samples are output, each sample consisting of different combinations of Cyan, Magenta and Yellow, the array including rows and columns, wherein an optimum maximum density value of at least one of the CMY values varies for each column and an optimum maximum density value of another of the CMY values varies for each row;
   receiving information indicating a selected sample which corresponds most closely with the desired output color;
   identifying optimum maximum density values for each of the Cyan, Magenta and Yellow values corresponding to the selected sample from the identifying information; and
   adjusting gamma correction curves for each of Cyan, Magenta and Yellow using the identified optimum maximum density values for the Cyan, Magenta and Yellow values corresponding to the selected sample, the gamma correction curves being used to adjust the color input values.

22. A computer readable medium containing a print utility allowing an end user to adjust gamma correction curves, said computer readable medium comprising instructions for:
   receiving a first set of color values corresponding to a desired output color;
   outputting an array of color output simulations using the first set of color values, the array consisting of a plurality of individual color samples having varying amounts of colors which differ by predetermined percentages, wherein the outputting varies an optimum maximum density value of each input color value by a predetermined amount for each sample;
   receiving information indicating a selected sample which corresponds most closely with the desired output color;
   identifying optimum maximum density values for each color from the selected sample; and
   adjusting gamma correction curves which are used to adjust input color values by using the optimum maximum density values identified for each color from the selected sample to alter the optimum maximum density value for each input color value by a predetermined amount.

23. A computer readable medium containing a print utility allowing an end user to adjust gamma correction cures, said computer readable medium comprising instructions for:
   inputting a first set of color values representing a set of colors used to output a desired output color;
   outputting an array of color output simulations using the first set of color values, the array consisting of a plurality of individual color samples having varying amounts of colors which differ by predetermined percentages, the output array including a plurality of combination color samples, each sample consisting of different optimum maximum density value of combinations of colors, the array consisting of rows and columns and wherein an optimum maximum density value of at least one of the color values varies for each column and an optimum maximum density value of another of the color values varies for each row;
   receiving information indicating a selected sample which corresponds most closely with the desired output color;
   identifying optimum maximum density values of the selected sample; and
   adjusting gamma correction curves which are used to adjust input color values using optimum maximum density values of the selected sample.

24. A computer readable medium containing a print utility allowing an end user to perform spot color dot gain adjustment, said computer medium comprising instructions for:

inputting a first set of color values representing a set of colors that correspond to a desired output value;

outputting an array of color output simulations using the first set of color values, the array consisting of a plurality of individual color samples having varying amounts of the colors and which differ by predetermined percentages, by outputting an array of combinations of color samples, each sample consisting of different combinations of colors, the array including rows and columns, wherein a dot gain of at least one of the colors values varies for each column and a dot of another of the color value varies for each row;

receiving information indicating a selected a sample which corresponds most closely with the desired output color;

identifying dot gains of color values corresponding to the selected sample; and adjusting gamma correction curves for each of the colors using the derived dot gains of the color values, corresponding to the selected sample the gamma correction curves being used to adjust the color input values.

* * * * *